(12) United States Patent
Li et al.

(10) Patent No.: US 11,178,209 B2
(45) Date of Patent: Nov. 16, 2021

(54) METHOD, DEVICE, AND SYSTEM FOR OPENING CROSS-DEVICE FILE

(71) Applicant: BOE TECHNOLOGY GROUP CO., LTD., Beijing (CN)

(72) Inventors: Yingjie Li, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 215 days.

(21) Appl. No.: 16/212,731

(22) Filed: Dec. 7, 2018

(65) Prior Publication Data
US 2019/0222631 A1 Jul. 18, 2019

(30) Foreign Application Priority Data
Jan. 18, 2018 (CN) .......................... 201810048214.4

(51) Int. Cl.
*H04L 29/08* (2006.01)
*G06F 16/16* (2019.01)
*G06F 16/182* (2019.01)

(52) U.S. Cl.
CPC .............. *H04L 67/06* (2013.01); *G06F 16/16* (2019.01); *G06F 16/183* (2019.01); *H04L 67/10* (2013.01); *H04L 67/16* (2013.01)

(58) Field of Classification Search
CPC ........... H04L 29/06027; H04L 65/1006; H04L 65/1016; H04L 67/06; H04L 67/16; G06F 16/16; G06F 16/183
See application file for complete search history.

(56) References Cited

U.S. PATENT DOCUMENTS

| 8,583,758 | B2* | 11/2013 | Casey | H04N 21/440218 709/217 |
| 8,693,391 | B2* | 4/2014 | Garcia-Martin | H04L 29/06027 370/328 |
| 9,380,456 | B1* | 6/2016 | Lee | H04W 12/0806 |
| 9,401,972 | B2* | 7/2016 | Yu | H04L 67/06 |
| 2016/0026366 | A1* | 1/2016 | Luan | G06F 8/61 715/747 |
| 2016/0198210 | A1* | 7/2016 | Torikai | H04N 21/43637 348/207.1 |
| 2017/0155702 | A1* | 6/2017 | Qiao | H04L 67/06 |

(Continued)

FOREIGN PATENT DOCUMENTS

| CN | 101697584 A | 4/2010 |
| CN | 103034635 A | 4/2013 |
| CN | 103297458 A | 9/2013 |

(Continued)

OTHER PUBLICATIONS

First Office Action dated Apr. 3, 2020 for corresponding Chinese application 201810048214.4.

*Primary Examiner* — Todd L Barker
(74) *Attorney, Agent, or Firm* — Nath, Goldberg & Meyer; Joshua B. Goldberg

(57) ABSTRACT

The present disclosure provides a method, a device and a system for opening cross-device file. The method includes: sending, by a first device, a file type of a file; determining, by the first device, a second device supporting the file type, and sending file information of the file to the second device so that the second device opens the file according to the file information.

13 Claims, 3 Drawing Sheets

(56) References Cited

U.S. PATENT DOCUMENTS

2018/0173575 A1\* 6/2018 Leibovici .............. G06F 16/178
2018/0341717 A1\* 11/2018 Miranda-Steiner ..........................
G06F 16/9574

FOREIGN PATENT DOCUMENTS

| CN | 104349177 A | 2/2015 | |
|---|---|---|---|
| CN | 104639553 \* | 5/2015 | ............. H04L 29/06 |
| CN | 106250182 A | 12/2016 | |
| GN | 102546779 B | 12/2014 | |
| GN | 105791360 A | 7/2016 | |

\* cited by examiner

METHOD, DEVICE, AND SYSTEM FOR OPENING CROSS-DEVICE FILE

CROSS-REFERENCE TO RELATED APPLICATION

The present application claims the priority to the Chinese Patent Application No. 201810048214.4, filed to the State Intellectual Property Office of China on Jan. 18, 2018, the disclosure of which is hereby incorporated by reference in its entirety.

TECHNICAL FIELD

The present application relates to the field of communication technology, and in particular, to a method, a device, and a system for opening cross-device file.

BACKGROUND

Mobile devices have become widely used in file management due to their intelligence and networking. For example, a mobile phone is used for storing pictures and videos, or receiving various shared documents. When information is to be displayed on another device, e.g., a PPT document in the mobile phone is to be played on a television, it may be displayed on the other device by way of screen sharing. However, the screen sharing requires that the device for storing the file (such as the mobile phone) and the device for displaying the file (such as the television) remain a network connection with each other all the time. When the network connection is unstable, the display may fail. Moreover, related operations should be performed on the device for storing the file (such as the mobile phone), and cannot be performed on the device for displaying the file (such as the television) side.

SUMMARY

In an aspect, the present disclosure provides a method for opening cross-device file including steps of: sending, by a first device, a file type of a file; and determining, by the first device, a second device supporting the file type among at least one second device, and sending file information of the file to the determined second device so that the determined second device opens the file according to the file information.

In some embodiments, the step of sending, by the first device, the file type of the file includes: sending, by the first device, a broadcast message which includes the file type and communication address information of the first device. The step of determining, by the first device, the second device supporting the file type includes: determining, by the first device, that the second device supports the file type in response to reception of reply information from a second device among the at least one second device.

In some embodiments, the step of sending, by the first device, the file type of the file includes: sending, by the first device, the file type to a server so that the server sends the file type to all second devices connected to the server among the at least one second device. The step of determining, by the first device, the second device supporting the file type includes: receiving from the server, by the first device, reply information of a second device among the at least one second device, and determining that the second device supports the file type.

In some embodiments, the step of sending, by the first device, the file type of the file includes: sending, by the first device, the file type to a server so that the server determines a second device supporting the file type according to the file type. The step of determining, by the first device, the second device supporting the file type includes: receiving from the server, by the first device, a device name of a second device supporting the file type, and determining that the second device having the received device name supports the file type.

In some embodiments, the reply information includes a device name of the second device.

In some embodiments, prior to the step of sending, by the first device, the file information to the second device, the method further includes: displaying, by the first device, device names of all determined second devices. The step of sending the file information to the determined second device includes: receiving, by the first device, an operation instruction of a user for selecting a device name from all displayed device names, and sending the file information to the determined second device having the selected device name.

The present application provides a method for opening cross-device file including steps of: receiving, by a second device, a file type of a file; determining, by the second device, whether the file type is supported or not, and sending a reply information if the file type is supported; and opening, by the second device, a file according to file information of the file when the file information is received.

In some embodiments, the step of receiving, by the second device, the file type of the file includes: receiving, by the second device, a broadcast message which includes the file type and communication address information. The step of sending, by the second device, the reply information includes: sending, by the second device, the reply information according to the communication address information.

In some embodiments, the step of receiving, by the second device, the file type includes: receiving, by the second device, the file type from a server. The step of sending, by the second device, the reply information includes: sending, by the second device, the reply information to the server. The step of receiving, by the second device, the file information includes: receiving, by the second device, the file information from the server.

In another aspect, the present disclosure provides a method for opening cross-device file including steps: receiving, by a server, a file type of a file sent by a first device, determining a second device supporting the file type among at least one second device, and sending information of the determined second device to the first device; and receiving, by the server, file information, and sending the file information to a selected second device among all determined second devices so that the selected second device opens the file according to the file information.

In some embodiments, the step of determining, by the server, the second device supporting the file type includes: searching for a device name corresponding to the file type from a preset correspondence between device names and file types, and determining that a second device having the device name among the at least one second device supports the file type.

In some embodiments, the step of determining, by the server, the second device supporting the file type includes: sending the file type to the at least one second device; and receiving reply information from a second device among the at least one second device, and determining that the second device supports the file type.

In some embodiments, the step of sending, by the server, the file information to the selected second device among all the determined second devices includes: receiving, by the server, a device name sent by the first device, and sending the file information to the selected second device among all the determined second devices having the received device name.

In some embodiments, prior to the step of receiving, by the server, the file type of the file sent by the first device, the method further includes receiving, by the server, a device name and a file type of a file which are sent by the at least one second device, and storing a correspondence between the device name of the at least one second device and the file type of the file sent by the at least one second device.

In another aspect, the present disclosure provides a first device including: a first sending module configured to send a file type of a file, and send file information of the file to a second device so that the second device open the file according to the file information; and a first receiving module configured to determine a second device supporting the file type.

In some embodiments, the first sending module is further configured to: send a broadcast message which includes the file type and communication address information of the first device; and send the file information to the second device. The first receiving module is further configured to: receive reply information from the second device and determine that the second device supports the file type.

In some embodiments, the first sending module is further configured to: send the file type to a server so that the server sends the file type to all second devices connected thereto; and send the file information to the server so that the server sends the file information to the second device. The first receiving module is further configured to: receive reply information of the second device from the server and determine that the second device supports the file type.

In some embodiments, the first sending module is further configured to: send the file type to a server; and send the file information to the server so that the server sends the file information to all second devices connected thereto. The first receiving module is further configured to: receive a device name of a second device from the server and determine that the second device supports the file type.

In some embodiments, the first sending module is further configured to: send the file type to a server; and send the file information and a device name of the second device to the server.

In another aspect, the present disclosure provides a second device including: a second receiving module configured to receive a file type and file information of a file; a first processing module configured to determine whether the received file type is supported by itself, and send notification information to a second sending module if the received file type is supported, and open the file according to the file information; and a second sending module configured to send reply information in response to receiving the notification information.

In some embodiments, the second receiving module is further configured to: receive a broadcast message; wherein the broadcast message includes the file type of the file and communication address information; and receive the file information. The second sending module is further configured to: receive the notification information, and send the reply information according to the communication address information.

In some embodiments, the second receiving module is further configured to: receive the file type from a server. The second sending module is further configured to: send the reply information to the server in response to receiving the notification information.

In another aspect, the present disclosure provides a server including: a third receiving module configured to receive a file type of a file sent by a first device, and receive file information; a second processing module configured to determine a second device supporting the file type; and a third sending module configured to send information of the second device to the first device, and send the file information to the second device so that the second device opens the file according to the file information.

In some embodiments, the second processing module is further configured to: search for a device name corresponding to the file type from a preset correspondence between the device names and the file types, and determine that a second device having the device name supports the file type.

In some embodiments, the second processing module is further configured to: send the file type; and receive reply information from the second device and determine that the second device supports the file type.

In some embodiments, the third receiving module is further configured to: receive the file type of the file; and receive the file information and a device name of the second device. The third sending module is further configured to: send the device name of the second device to the first device; and send the file information to the second device having the received device name.

BRIEF DESCRIPTION OF THE FIGURES

The drawings, which constitute a part of the specification, are provided for further understanding and explaining the technical solutions of the present disclosure, and should not be considered as a limitation thereof.

DETAILED DESCRIPTION

The embodiments of the present disclosure will be described below in detail in conjunction with the drawings. It should be noted that the embodiments and the features in the embodiments of the application may be combined with each other arbitrarily in case of no conflict.

The steps as shown in the flow charts of the drawings may be carried out in a computer system such as a set of computer-executable instructions. Moreover, although a logic sequence is shown in a flow chart, in some cases, the steps as illustrated or described may be carried out in a sequence different from the sequence as illustrated or described herein.

Figure 1:
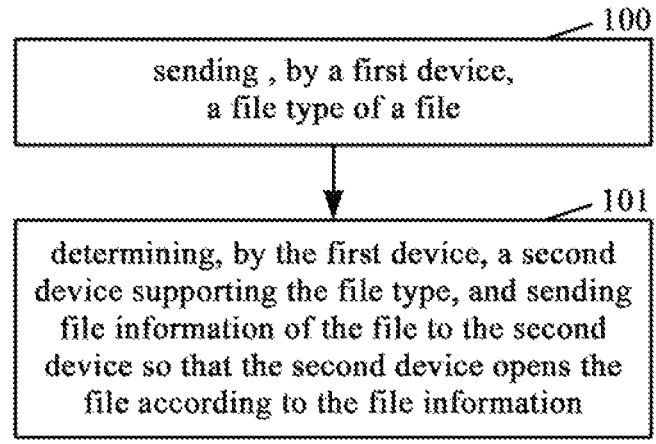
FIG. 1 is a flow chart of a method for opening cross-device file on a first device side according to the present application.

Referring to FIG. 1, the present disclosure provides a method for opening cross-device file (i.e. opening a file across different devices) which adds, to each of a first device and a second device, a control unit for causing an external device to open a file. The control unit is configured to achieve that a file in a device can be opened by an external device. When installed on the first device and the second device, the control unit registers, to an operating system of the device on which the control unit is installed, file types supported by the device; and may provide to another device the file types supported by the device. For example, the control unit installed on the first device acquires a file type supported by the first device, while the control unit installed on the second device acquires a file type supported by the second device and provides the same to the first device. When the first device opens a file, it may acquire all program application units in the first device supporting the file type of the file, and acquire the second device (corresponding to the control unit) supporting the file type. At this time, all the program application units (including the control unit) may be displayed for selection by a user. When the user select the control unit to open the file, i.e., when the file is opened by the external device (e.g., the second device) supporting the file type, the first device performs the following steps of a method.

It should be noted that, when the control unit registers, to the operating system of a device on which the control unit is installed, file types supported by this device, the control unit may register all possible file types, or some of them. As the number of the registered file types increases, the number of the file types of files which can be opened by an external device increases.

It should be noted that, the first device herein refers to a device provides a file to be opened (i.e., the target file); for example, a device in which a file to be opened is stored. The second device(s) is/are one or more external devices except for the first device, which is/are the candidate(s) that actually perform(s) the operation of opening the target file. For example, when there are multiple second devices, one of the multiple second devices which is to actually open the target file may be selected on the first device, so that the file is opened across devices.

The method includes Step 100 and Step 101.

At Step 100, the first device sends a file type of a file.

In this step, the first device may send the file type of the file by using any of the following three modes: a first mode, a second mode and a third mode.

In the first mode, the first device and the second device communicate with each other via a local area network (LAN), and the first device may send broadcast information in the LAN; wherein the broadcast information includes the file type of the file. In this case, since the communication address of the first device is not known to the second device, the broadcast information further includes the communication address information of the first device, so that the second device may send reply information to the first device according to the communication address information of the first device after the broadcast information is received by the second device. The communication address information may include a communication address and a communication port.

In some embodiments, the broadcast information may be sent using User Datagram Protocol (UDP) in the LAN.

In the second mode, the first device, the server and the second device communicate with each other via the LAN. The second device sends the file type(s) supported by itself to the server, and the server stores a correspondence between the device name and the file type(s) of the second device upon reception of the file type(s) supported by the second device. In this case, the first device needs to send the file type(s) of the file(s) to the server.

In the third mode, the first device and the server communicate with each other via a wide area network (WAN), and the server and the second device communicate with each other via the LAN or the WAN. In this case, the second device needs to connect to the server first. In this case, the first device needs to send the file type(s) of the file(s) to the server.

At Step 101, the first device determines the second device supporting the sent file type, and sends file information of the file to the second device so that the second device opens the file according to the file information.

In this step, when the first device sends the file type by using the first mode, the first device may determine whether the second device supports the file type or not according to the reply information of the second device is received or not. If the reply information of the second device is received, it is determined that the second device supports the file type; otherwise, it is determined that the second device does not support the file type.

In this case, since the communication address of the second device is not known to the first device, the reply information includes at least communication address information of the second device. In some embodiments, the reply information further includes the device name of the second device.

When the first device sends the file type of the file by using the second mode, the first device may determine whether the second device supports the file type or not according to the device name of the second device from the server is received or not. Specifically, if the device name of the second device is received from the server, it is determined that the second device supports the file type; otherwise, it is determined that the second device does not support the file type.

When the first device sends the file type of the file by using the third mode, the first device may determine whether the second device supports the file type or not according to the reply information of the second device forwarded by the server is received or not. Specifically, if the reply information of the second device is received from the server, it is determined that the second device supports the file type; otherwise, it is determined that the second device does not support the file type.

When the first device sends the file type by using the first mode, the first device sends the file information to the second device. When the first device sends the file type by using the second mode or the third mode, the first device sends the file information to the server which forwards the file information to the second device.

In this step, the first device may send the file information to at least one second device supporting the file type.

In this step, the file information may be the file its own, or a uniform resource locator (URL) corresponding to the file.

In an embodiment, after receiving the device name(s) of the second device(s), the first device may display the received device name(s) of all the second device(s), for example, in a list.

As such, upon reception of a operation instruction of a user with respect to a device name (e.g., selecting the device name of a specific second device from the device names of all second devices in the displayed list), the first device may send the file information to the second device corresponding to the operation instruction (e.g., the second device having the selected device name).

It should be noted that, the user selects at least one of the displayed device names of the second device based on the operation instruction, and the second device having the selected device name servers as the device for opening the file.

Obviously, after the first device receives the device names of the second devices, it may send the file information to any one or more of the second devices instead of displaying the device names of all the second devices.

Obviously, the first device may also send the file information to the second device(s) based on a preset rule. The specific way to select a second device to which the information will be sent is not a limitation to the protective scope of the present disclosure, as long as the first device can send the file information to at least one external device to open the file.

It should be noted that, in a case that the first device sends the file type of the file by using the second mode or the third mode, the server may determine which second device the file information will be sent to. In this case, the first device merely needs to send the file information to the server.

Obviously, the first device may also determine which second device the file information will be sent to. In this case, when sending the file information to the server, the first device should further send the device name of the second device to the server so as to inform the server of which second device the file information will be sent to.

In an embodiment, prior to sending, by the first device, the device name of the second device to the server, the method further includes: displaying, by the first device, the received device name of all second devices.

In this case, upon receiving an operation instruction of a user with respect to a device name (e.g., selecting the device name of a specific second device from the device names of all second devices in the displayed list), the first device sends the device name (e.g., the selected device name) of the second device corresponding to the operation instruction so as to request the server to send the file information to the second device corresponding to the operation instruction (e.g., the second device having the selected device name).

In the solution of the present application, the first device determines the second device supporting the file type and sends the file information to the second device so that the second device opens the file according to the file information. As such, after the file is received by the second device, the second device may perform the operation directly by itself without having to maintain the network connection with the first device and any further operation performed on the first device. An easy operation on the device which actually opens the file is achieved, and a rate of successful display is improved. In the solution, there may be one or more second devices, which improves the flexibility of opening a file.

Figure 2:
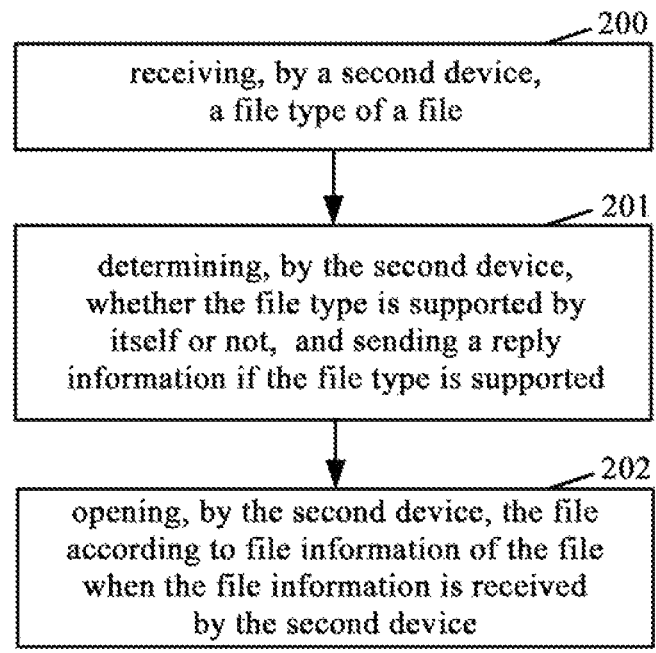
FIG. 2 is a flow chart of a method for opening cross-device file on a second device side according to the present application.

Referring to FIG. 2, the present disclosure provides a method for opening cross-device file including Step 200 to Step 202.

At Step 200, the second device receives a file type.

In this step, in some embodiments, the second device receives broadcast information. The broadcast information includes a file type of a file and communication address information. In some embodiments, the second device receives the file type from the server.

The broadcast information may be sent by the first device. In this case, the communication address information is the communication address information of the first device; alternatively, the broadcast information may be forwarded by the server after it receives the file type sent by the first device. In this case, the communication address information is the communication address information of the server.

At Step 201, the second device determines whether the received file type is supported by itself, and sends reply information if the received file type is supported.

In this step, in some embodiments, the second device may send the reply information according to the communication address information; in some embodiments, the second device sends the reply information to the server.

In some embodiments, sending, by the second device, the reply information according to the communication address information includes: sending, by the second device, the reply information to the first device according to the communication address information of the first device. In some embodiments, sending, by the second device, the reply information according to the communication address information includes: sending, by the second device, the reply information to the server according to the communication address information of the server.

In this step, all the program application units (including the control unit) in the second device, when installed, registers file types supported by itself to the operating system. Thus, the second device can acquire all the file types supported by itself in the operating system, and determine whether a received file type of a file is supported by itself based on whether the received file type of the file is included in the acquired file types supported by the second device itself or not. Specifically, if the received file type of the file is included in the acquired file types supported by the second device itself, the second device determines that the received file type of the file is supported by itself; on the other hand, if the received file type of the file is not included in the acquired file types supported by the second device itself, the second device determines that the received file type of the file is not supported by itself.

In an embodiment, the reply information includes the communication address information of the second device. In some embodiments, the reply information further includes the device name of the second device.

In an embodiment, the second device may send the reply information to the first device via the Transmission Control Protocol (TCP), such as the Hyper Text Transport Protocol (HTTP). The specific way to send the reply information is not a limitation to the protective scope of the present disclosure, as long as the reply information is sent to the first device so that the first device can send file information to the second device to open the file.

At Step 202, the second device opens the file according to the file information when the file information is received.

In this step, if the file information is the file, the second device can open the file directly; if the file information is an URL, the second device can acquire the file according to the URL and open it.

In an embodiment, before starting to receive the file information, the second device may first ask the user whether a operation for opening cross-device file is allowed. If an operation instruction indicative of allowing from the user is received, the second device receives the file information; if an operation instruction indicative of not allowing from the user is received, it returns rejection information back to the first device.

In an embodiment, the second device may select any of the program application units in the device which support the file type to open the file after receiving the file information and acquiring the file; alternatively, the second device may acquire and display all the program application units in the device which support the file type, and select a program application unit corresponding to an operation instruction of a user (i.e., the selected program application unit) to open the file when the operation instruction of the user for selecting a program application unit actually opening the file is received.

Figure 3:
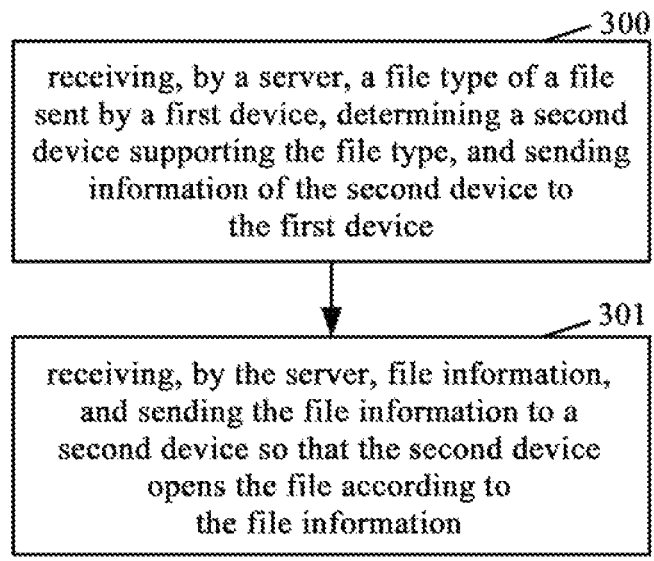
FIG. 3 is a flow chart of a method for opening cross-device file on a server side according to the present application.

Referring to FIG. 3, the present disclosure provides a method for opening cross-device file including Step 300 and Step 301.

At Step 300, the server receives a file type of a file sent by a first device, determines a second device supporting the file type, and sends information of the second device to the first device.

In this step, in some embodiments, determining, by the server, the second device supporting the file type includes: searching for a device name corresponding to the file type of the file from a preset correspondence between device names and file types, and determining that a second device having the device name supports the file type. In this case, the server may send a found device name of a second device to the first device so as to inform the first device of which second devices support the file type.

In some embodiments, determining, by the server, the second device supporting the file type includes: sending the file type; and receiving reply information from a second device, and determining that the second device sending the reply information supports the file type. In this case, the server may forward reply information of the second device(s) to the first device or send device name(s) of the second device(s) to the first device, so as to inform the first device of which second device(s) supports/support the file type.

In some embodiments, the server may send the file type via a broadcast message; wherein the broadcast message includes the file type and the communication address information of the server. In some embodiments, the server directly sends the file type to the second device.

At Step 301, the server receives file information, sends the file information to the second device so that the second device opens the file according to the file information.

In this step, the server may send the file information to at least one second device supporting the file type.

In an embodiment, the server further receives a device name of a second device in addition to the file information. In this case, the server directly sends the file information to the second device having the received device name.

In an embodiment, prior to Step 300, the method further includes: receiving, by the server, file types of files sent by all second devices, and storing a correspondence between device names of the second devices and the file types of the files.

Obviously, the above correspondence may be preset in the server.

Figure 4:
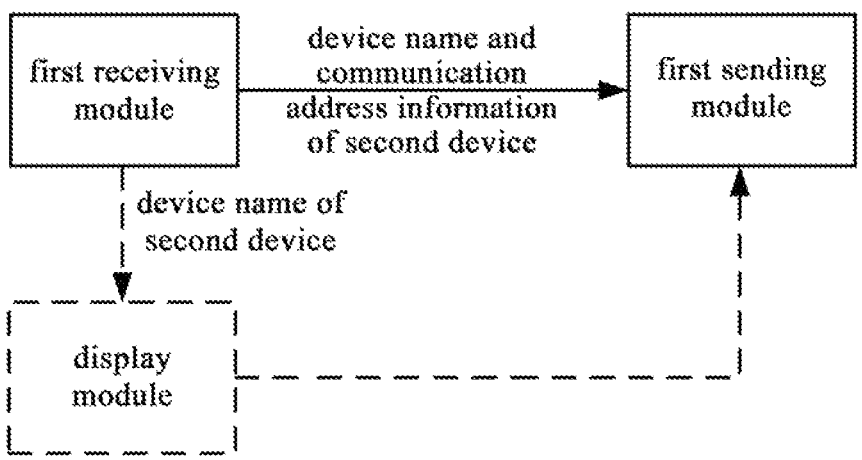
FIG. 4 is a schematic diagram of a structure of a first device according to the present application.

Referring to FIG. 4, the present disclosure provides a first device including: a first sending module configured to send a file type of a file, and send file information of the file to a second device so that the second device open the file according to the file information; and a first receiving module configured to determine a second device supporting the file type.

In some embodiments, the first sending module is further configured to: send a broadcast message which includes the file type and communication address information of the first device; and send the file information to the second device. The first receiving module is further configured to: receive reply information from the second device, and determine that the second device supports the file type.

In some embodiments, the first receiving module is further configured to receive a device name of a second device. The first device further includes: a display module (for example, any component that has a display function such as a display or a display panel) for displaying the device names of all second devices. The sending module is further configured to: send a broadcast message which includes the file type and the communication address information of the first device; and receive an operation instruction of a user for selecting a specific device name from the device names of all second devices, and send the file information to the second device(s) having the selected specific device name.

In some embodiments, the first sending module is further configured to: send the file type to a server so that the server sends the file type to all second devices connected therewith; and send the file information to the server so that the server sends the file information to the second device. The first receiving module is further configured to: receive reply information of the second device from the server, and determine that the second device supports the file type.

In some embodiments, the first sending module is further configured to: send the file type to a server; and send the file information to the server so that the server sends the file information to the second device. The first receiving module is further configured to: receive a device name of a second device from the server, and determine that the second device supports the file type.

In some embodiments, the first sending module is further configured to: send the file type to a server; and send the file information and a device name of the second device to the server.

Figure 5:
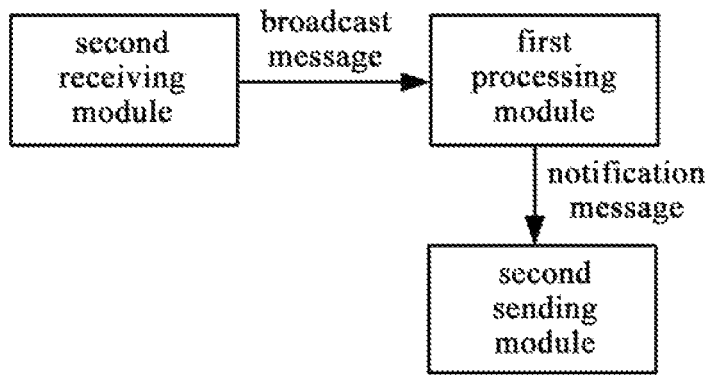
FIG. 5 is a schematic diagram of a structure of a second device according to the present application.

Referring to FIG. 5, the present disclosure provides a second device including: a second receiving module configured to receive a file type and file information; a first processing module configured to determine whether the received file type is supported by itself, and send notification information to a second sending module if the received file type is supported, and open a file according to the file information; and a second sending module configured to send reply information in response to reception of the notification information.

In some embodiments, the second receiving module is further configured to: receive a broadcast message; wherein the broadcast message includes the file type of the file and communication address information; and receive the file information. The second sending module is further configured to: receive the notification information, and send the reply information according to the communication address information.

In some embodiments, the second receiving module is further configured to: receive the file type from a server. The second sending module is further configured to: send the reply information to the server in response to reception of the notification information.

Figure 6:
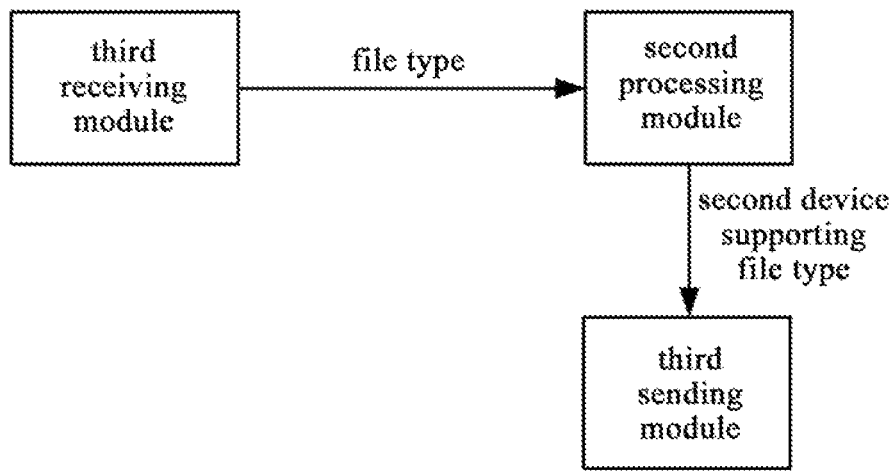
FIG. 6 is a schematic diagram of a structure of a server according to the present application.

Referring to FIG. 6, the present disclosure provides a server including: a third receiving module configured to receive a file type of a file sent by a first device, and receive file information; a second processing module configured to determine a second device supporting the file type; and a third sending module configured to send information of the second device to the first device, and send the file information to the second device so that the second device opens the file according to the file information.

In some embodiments, the second processing module is further configured to: search for a device name corresponding to the file type from a preset correspondence between device names and file types, and determine that a second device having the device name supports the file type.

In some embodiments, the second processing module is further configured to: send the file type; receive reply information from the second device, and determine that the second device supports the file type.

In some embodiments, the third receiving module is further configured to: receive the file type of the file; and receive the file information and a device name of the second device. The third sending module is further configured to: send the device name of the second device to the first device; and send the file information to the second device having the received device name.

It should be noted that, the first device, the second device and/or the server according to an embodiment of the present disclosure may be implemented as a storage and a processor coupled with each other, wherein the storage stores computer-executable instructions which, when executed by the processor, can enable the processor to perform the functions of the first receiving module, the first sending module, the first processing module, the second receiving module, the second sending module, the second processing module, the third receiving module and/or the third sending module as described above. Examples of a proper storage include but are not limited to: a magnetic disc or a tape; an optical storage medium such as a compact disc (CD) or a digital versatile disc (DVD); a flash storage; and other non-transient media. Optionally, the storage is a non-transient storage.

Obviously, the first device, the second device and/or the server according to an embodiment of the present disclosure are not limited thereto, and may be implemented as a combination of other software and hardware.

Figure 7:
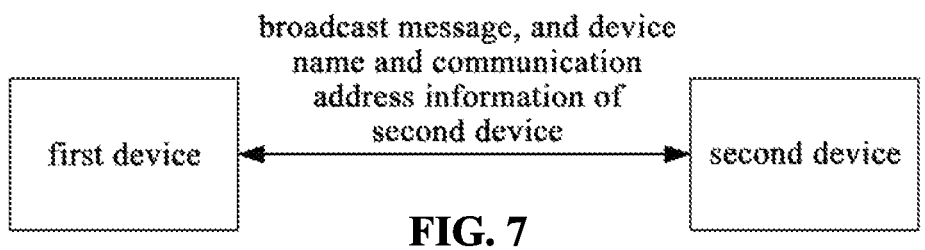
FIG. 7 is a schematic diagram of a structure of a system for opening cross-device file according to the present application.

Referring to FIG. 7, the present disclosure provides a system for opening cross-device file which includes a first device and a second device. The first device is configured to send a broadcast message which includes a file type of a file and communication address information of the first device; receive reply information of the second device and determine that the second device supports the file type; and send file information of the file to the second device so that the second device opens the file according to the file information. The second device is configured to receive the broadcast message sent by the first device, wherein the broadcast message includes the file type of the file and the communication address information of the first device; determine whether the file type is supported by itself, and send the reply information to the first device according to the communication address information of the first device if the file type is supported; and open the file according to the file information when the file information is received.

In some embodiments, the reply information includes a device name of the second device. The first device is further configured to: display the device names of all second devices; and receive an operation instruction of a user for selecting a specific device name from the device names of all second devices, send the file information to a second device having the selected specific device name.

Figure 8:
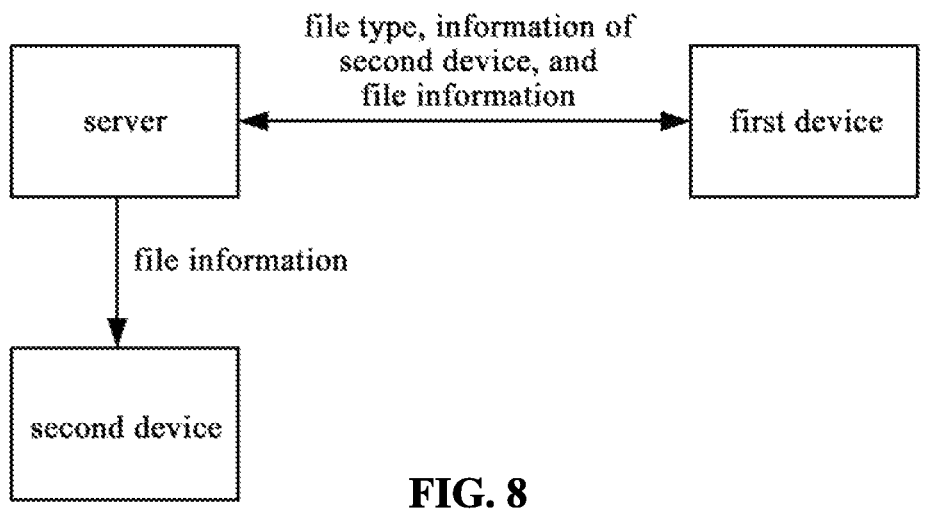
FIG. 8 is a schematic diagram of a structure of another system for opening cross-device file according to the present application.

Referring to FIG. 8, the present disclosure provides a system for opening cross-device file which includes: a first device, a server, and a second device. The first device is configured to send a file type to the server; receive information of the second device supporting the file type and determine that a second device supports the file type; and send file information to the server so that the server send the file information to the second device. The server is configured to: receive the file type of a file sent by the first device, determine a second device supporting the file type, and send the information of the second device to the first device; and receive the file information and send the same to the second device so that the second device opens the file according to the file information. The second device is configured to: receive the file information of the file and open the file according to the file information.

In some embodiments, the server is further configured to: receive the file type of the file sent by the first device, search for a device name corresponding to the file type from a preset correspondence between device names and file types, and send a found device name to the first device; receive the file information, and send the same to the second device having the found device name.

In some embodiments, the server is further configured to: receive the file type of the file sent by the first device, send the file type to the second device, receive reply information of the second device, and send the device name of the second device to the first device; receive the file information, and send the same to the second device having the found device name. The second device is further configured to: receive the file type and send the reply information to the server.

In some embodiments, the first device is further configured to: send the file type to the server; receive a device name of a second device supporting the file type of the file, and send the file information and the device name of the second device to the server. The server is further configured to: receive the file type of the file sent by the first device, search for the device name(s) corresponding to the file type from the preset correspondence between the device names and the file types, and send the found device name(s) to the first device; receive the file type and the device name(s) of the second device(s), and send the file information to the second device(s) corresponding to the received device name(s).

In some embodiments, the second device is further configured to send the file type(s) supported by itself to the server. The server is further configured to receive the file type(s) sent by the second device and store the correspondence between the device name(s) of the second device and the file type(s).

It will be appreciated that, the above implementations are exemplary implementations simply for illustrating the principle of the present disclosure. However, the present disclosure is not limited thereto. An ordinary person skilled in the art may make various modifications and variations without departing from the spirit and the essence of the present disclosure. These modifications and variations should also be considered as within the protective scope of the present disclosure.

What is claimed is:

1. A method for opening cross-device file, comprising steps of:

adding, to a first device and a second device, a control unit for causing an external device to open a file, the control unit being configured to make the file in the device to which the control unit is added to be opened by the external device, and being configured to register, to an operating system of a device on which the control unit is installed, file types supported by the device on which the control unit is installed, in response to the Control unit being installed on the first device or the second device, wherein the method comprises, in response to a user choosing to open the file through the control unit;

sending, by the first device, broadcast information including a file type of the file and communication address information of the first device; and determining, by the first device, the second device supporting the file type, and sending file information of the file to the second device, and performing, by the second device and after the file information is received by the second device, an operation directly by itself without maintaining a network connection with the first device and without any further operation performed on the first device, the file information including a uniform resource locator, the second device acquiring the file according to the uniform resource locator and opening it.

2. The method of claim 1, wherein the step of determining, by the first device, the second device supporting the file type comprises:

determining, by the first device, that the second device supports the file type in response to reception of a reply information from the second device.

3. The method of claim 2, wherein the reply information comprises a device name of the second device.

4. A method for opening cross-device file, comprising steps of:

adding, to a first device and a second device, a control unit for causing an external device to open a file, the control unit being configured to make the file in the device to which the control unit is added to be opened by the external device, and being configured to register, to an operating system of a device on which the control unit is installed, file types supported by the device on which the control unit is installed, in response to the control unit being installed on the first device or the second device, wherein, the method comprises, in response to a user choosing to open the file through the control unit;

receiving, by the second device, broadcast information including a file type of a file and communication address information of the first device;

determining, by the second device, whether the file type is supported or not, and sending a reply information if the file type is supported; and performing, by the second device and when the second device receives the file information, an operation directly by itself without maintaining a network connection with the first device and without any further operation performed on the first device, the file information including a uniform resource locator, the second device acquiring the file according to the uniform resource locator and opening it.

5. The method of claim 4, wherein the step of sending, by the second device, the reply information comprises: sending, by the second device, the reply information according to the communication address information.

6. A method for opening cross-device file, comprising steps of:

adding, to a first device and a second device, a control unit for causing an external device to open a file, the control unit being configured to make the file in the device to which the control unit is added to be opened by the external device, and being configured to register, to an operating system of a device on which the control unit is installed, file types supported by the device on which the control unit is installed, in response to the control unit being installed on the first device or the second device, wherein, the method comprises, in response to a user choosing to open the file through the control unit;

receiving, by a server, a file type of a file sent by a first device, determining the second device supporting the file type, and sending information of the second device to the first device; and receiving, by the server, file information, and sending the file information to the second device, performing, by the second device and after the file information is received by the second device, an operation directly by itself without maintaining a network connection with the first device and without any further operation performed on the first device, the file information including a uniform resource locator, the second device acquiring the file according to the uniform resource locator and opening it.

7. The method of claim 6, wherein the step of determining, by the server, the second device supporting the file type comprises:

searching for a device name corresponding to the file type from a preset correspondence between device names and file types, and determining that the second device having the device name supports the file type.

8. The method of claim 6, wherein the step of determining, by the server, the second device supporting the file type comprises:

sending the file type; and receiving a reply information from the second device, and determining that the second device supports the file type.

9. The method of claim 6, wherein the step of sending, by the server, the file information to the second device comprises:

receiving, by the server, a device name sent by the first device, and sending the file information to the second device having the received device name.

10. The method of claim 6, prior to the step of receiving, by the server, the file type of the file sent by the first device, the method further comprises:

receiving, by the server, a device name and a file type of a file which are sent by at least one second device, and storing a correspondence between the device name of the at least one second device and the file type of the file sent by the at least one second device.

11. An electronic device, wherein the electronic device is the first device performing the method for opening cross-device file of claim 1.

12. An electronic device, wherein the electronic device is the second device performing the method for opening cross-device file of claim 4.

13. An electronic device, wherein the electronic device is the server performing the method for opening cross-device file of claim 6.

* * * * *